(12) United States Patent
Patel

(10) Patent No.: US 7,820,755 B2
(45) Date of Patent: Oct. 26, 2010

(54) RESIN BASED FLUORESCENT PAINT

(75) Inventor: Naresh B. Patel, Bridgewater, NJ (US)

(73) Assignee: Illinois Tool Works, Inc., Glenview, IL (US)

( * ) Notice: Subject to any disclaimer, the term of this patent is extended or adjusted under 35 U.S.C. 154(b) by 1086 days.

(21) Appl. No.: 11/470,181

(22) Filed: Sep. 5, 2006

(65) Prior Publication Data

US 2008/0058453 A1    Mar. 6, 2008

(51) Int. Cl.
*C08F 8/30* (2006.01)
*C08F 283/04* (2006.01)
*C08G 1/04* (2006.01)
*C08G 18/08* (2006.01)
*C08G 18/28* (2006.01)
*C08G 18/42* (2006.01)
*C08J 3/00* (2006.01)
*C08K 5/00* (2006.01)
*C08K 5/07* (2006.01)
*C08K 5/13* (2006.01)
*C08K 5/52* (2006.01)
*C08K 9/04* (2006.01)
*C08L 75/00* (2006.01)

(52) U.S. Cl. ............... 524/590; 524/145; 524/236; 524/340; 524/361; 524/445; 524/507; 524/589; 525/123; 525/455

(58) Field of Classification Search ............ 524/507, 524/589, 590, 145, 236, 340, 361, 445; 525/123, 525/455
See application file for complete search history.

(56) References Cited

U.S. PATENT DOCUMENTS

| 2,978,424 | A | * | 4/1961 | Atwood et al. | 523/455 |
| 3,645,933 | A | * | 2/1972 | Flint | 404/93 |
| 3,778,395 | A | * | 12/1973 | Huelsman et al. | 524/590 |
| 4,144,212 | A | * | 3/1979 | Linder et al. | 524/818 |
| 4,145,503 | A | * | 3/1979 | Emmons et al. | 526/282 |

* cited by examiner

*Primary Examiner*—Patrick D Niland
(74) *Attorney, Agent, or Firm*—Levenfeld Pearlstein, LLC

(57) ABSTRACT

A resin based fluorescent paint with decreased drying time and improved fluorescent durability is formulated from a resin present in a concentration of about 55 percent to about 65 percent, by weight, an active solvent, for and compatible with the resin, present in a concentration of about 5 percent to about 10 percent, by weight, a gelative additive present in a concentration of about 1 percent to about 5 percent, by weight, a rheological additive present in a concentration of about 1 percent to about 5 percent, by weight, an anti-skinning additive present in a concentration of about 1 percent to about 5 percent, by weight, a fluorescent pigment present in a concentration of about 20 percent to about 30 percent, by weight, a synthetic drier in a concentration of less than 1 percent, by weight, and a wetting agent in a concentration of about less than 1 percent, by weight. The paint of the present invention is particularly suited for the purpose of detection of vibration loosening or tampering.

16 Claims, 1 Drawing Sheet

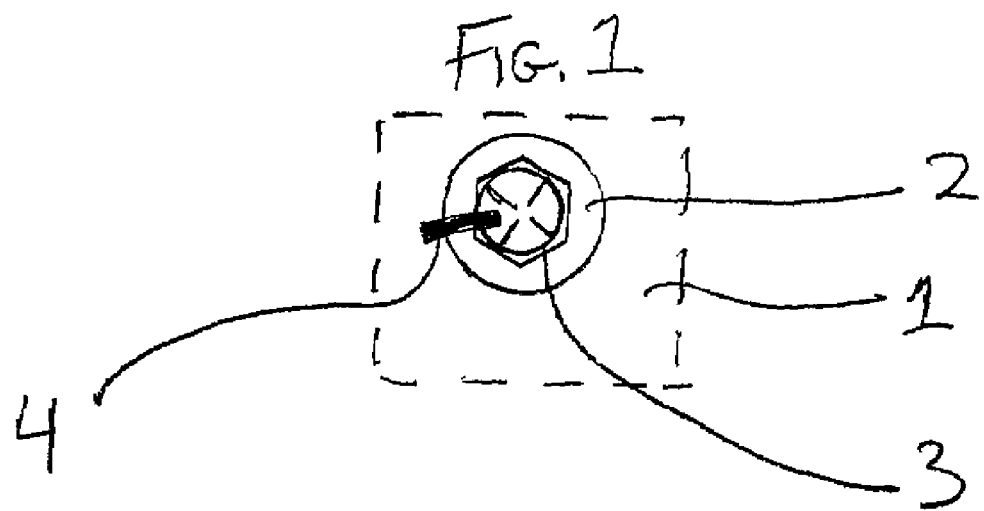
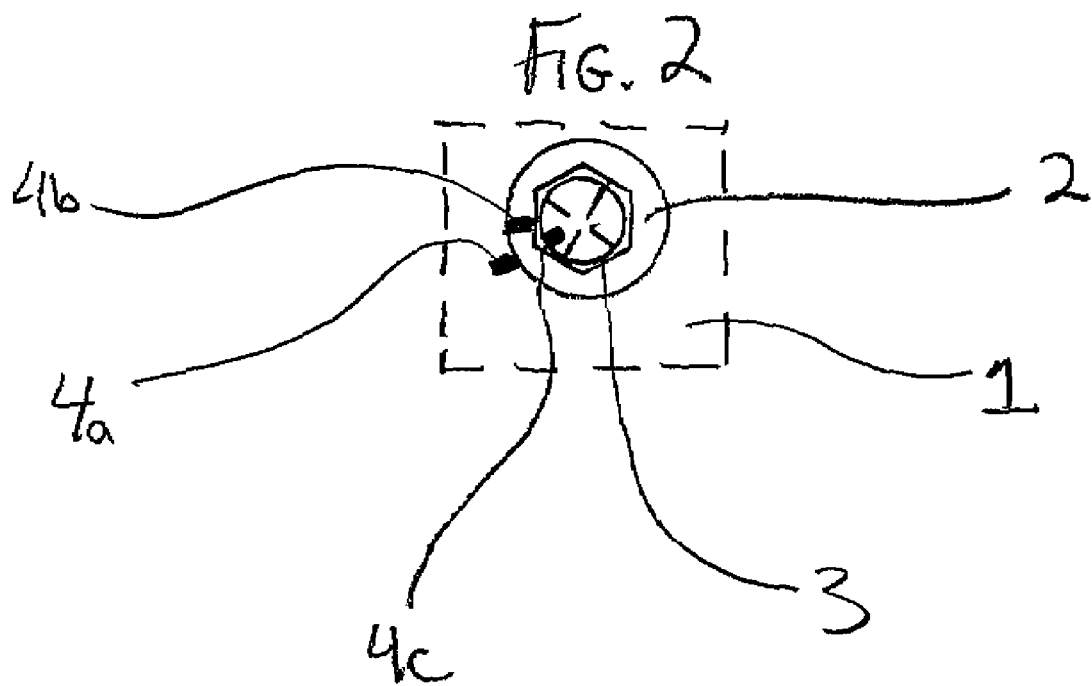

RESIN BASED FLUORESCENT PAINT

BACKGROUND OF THE INVENTION

The present invention is directed to a paint. More particularly, the present invention is directed to a readily applicable, resin based fluorescent inspection paint for use in marking items, particularly for the purpose of detection of vibration loosening or tampering.

Inspection paints are used in myriad applications to visually detect movement or tampering. Such paints are configured to adhere to, and form a breakable marking seal between, adjacent items that may undergo relative movement. For example, inspection paints may be applied to compression fittings, baseplates, studs, nuts, bolts, screws, fasteners, instrument and gauge housings and calibration mechanisms, parts and numerous other assemblies. Once dry, inspection paints become brittle and will crack if disturbed. Thus, when applied to adjacent items, inspection paints may be used to determine whether the two items have undergone relative movement.

Such inspection paints are used in many applications. For example, inspection paints may be applied to the lug nuts attaching a vehicle wheel to an axle. Once the lug nuts are applied to the studs and properly torqued, inspection paint may be applied across the stud and the lug nut. Should the lug nut happen to loosen from the stud as a result of vibration or other means, the inspection paint marking will break, signaling that the lug nut has loosened. Similarly, an inspection paint may be applied to screws fastening the sealed chassis of an electronic device, such as a television. If the chassis is opened without authorization, the inspection paint marking will break, indicating a potential warranty tampering situation.

Numerous prior art inspection paints have been developed to assist with monitoring of vibration loosening and tampering. Such inspection paints must be able to adhere to marked items without being readily removed or rubbed off the items. Additionally, such inspection paints must be formulated so as to not flake off the items, but rather to fracture, upon relative movement of the items. Additionally, many prior art inspection paints are fluorescent in order to assist with viewing the marking seal in low light conditions. However, prior art inspection paints suffer from several significant limitations.

For example, since most prior art inspection paints are water based, the time required for the paint to dry sufficiently to form a reliable, breakable marking is significant, typically on the order of 24 hours. Such a lengthy cure time is undesirable and impractical for many applications.

Moreover, all known prior art fluorescent inspection paints lose their fluorescence after exposure to elevated temperatures (on the order of 300 degrees Fahrenheit). Since inspection paints, in some environments, may be subject to extreme temperatures, and since the enhanced visibility provided by fluorescent inspection paints is critical in some applications, prior art inspection paints are impractical for such environments and applications.

Accordingly, there exists a need for an inspection paint that enhances the ability to detect relative movement between adjacent items, particularly movement caused by vibration loosening or tampering. Desirably, such a paint is resin based and offers a faster drying time as compared to prior art inspection paints. More desirably, such a paint is fluorescent to improve visibility of the paint in low light conditions. Most desirably, such a paint exhibits improved fluorescent durability after exposure to elevated temperatures as compared to prior art inspection paints.

BRIEF SUMMARY OF THE INVENTION

The present invention comprises a resin based fluorescent paint for use in marking items in order to detect relative movement between two adjacent items, and particularly for the purpose of detection of vibration loosening or tampering. Preferably, such a paint is quick-drying to allow for the prompt handling of items that have been marked using the paint. The paint also exhibits improved fluorescent durability after exposure to elevated temperatures. The paint in the preferred embodiment is orange.

The paint of the present invention is a resin based fluorescent inspection paint and includes a resin, preferably a polyurethane resin, present in a concentration of about 55 percent to about 65 percent, by weight, of the paint. An active solvent, preferably mineral spirits, for and compatible with the resin, is present in a concentration of about 5 percent to about 10 percent, by weight, of the paint.

The paint further includes a gelative additive. The preferred gelative additive is the solvent diacetone alcohol, present in a concentration of about 1 percent to about 5 percent, by weight, of the paint. A rheological additive, preferably organically modified hectorite clay, also is present in a concentration of about 1 percent to about 5 percent, by weight, of the paint.

The paint also includes an anti-skinning additive present in a concentration of about 1 percent to about 5 percent, by weight, of the paint. In the preferred formulation of the paint, the anti-skinning additive is a combination of methyl ethyl ketoxime and guiacol. A fluorescent pigment also is present in the paint in a concentration of about 20 percent to about 30 percent, by weight, of the paint. In a present paint, the fluorescent pigment is a synthetic colorant that is orange in color.

In addition, the paint includes synthetic driers in a concentration of about less than 1 percent, by weight, of the paint. In the preferred embodiment, the synthetic driers comprise a combination of cobalt soap solution and zirconium soap solution.

Finally, a wetting agent in a concentration of about less than 1 percent, by weight, preferably is present in the paint to aid in the disbursement of the pigment. The preferred wetting agent is soya lecithin.

These and other features and advantages of the present invention will be apparent from the following detailed description and drawings in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 1 is a top view of a bolt and washer having a marking formed by the resin based fluorescent paint of the present invention; and FIG. 2 is a top view of the bolt and washer of FIG. 1 wherein the marking has been broken due to movement of the bolt and washer.

DETAILED DESCRIPTION OF THE INVENTION

While the present invention is susceptible of embodiment in various forms, there is shown in the drawings and will hereinafter be described several preferred embodiments with the understanding that the present disclosure is to be considered an exemplification of the invention and is not intended to limit the invention to the specific embodiments illustrated.

It should be further understood that the title of this section of the specification, namely, "Detailed Description of the Invention," relates to a requirement of the United States Patent and Trademark Office, and does not imply, nor should be inferred to limit the subject matter disclosed herein.

The present invention comprises a resin based fluorescent paint for use in marking items in order to detect relative movement between two adjacent items, and particularly for the purpose of detection of vibration loosening or tampering. The preferred paint is of the type that will adhere to many different items, including metal parts and the like. Moreover, the present paint is formulated to greatly reduce or eliminate corrosion of the parts caused by the paint.

The paint of the present invention exhibits the highly desirable characteristics of decreased drying time and improved fluorescent durability after exposure to elevated temperatures as compared to prior art, water-based inspection paints. Decreased drying time permits the marked items to be handled much sooner than parts marked with prior art paints. Such decreased drying time provides substantial cost savings since the downtime associated with waiting for the paint to dry is minimized. Increased fluorescent durability is particularly useful in applications where the marked items are exposed to high temperatures.

The present fluorescent paint is formulated from a resin carried in a compatible active solvent. The paint includes a pigment, an anti-skinning additive, a synthetic drier, a wetting additive, a gelative additive and a rheological additive. Preferably, the resin is a polyurethane (urethane alkyd polymer). In the preferred formulation, the active solvent is mineral spirits. An additional solvent, diacetone alcohol, is added as a gelative additive. Other resins, as well as other solvents compatible with polyurethane resins and such other resins, will be recognized by those skilled in the art.

In the present paint, the polyurethane resin is provided in a liquid form, such as the oil-modified aromatic polyurethane resin commercially available from Hexion Specialty Chemicals of Columbus, Ohio under the trademark Carbamac 43-4355. The polyurethane resin is present in a concentration of about 55 percent to about 65 percent, by weight, of the paint, and preferably about 59 percent, by weight, of the paint. Those skilled in the art will recognize the various other resins that can be used in the present paint, which other resins are within the scope and spirit of the present invention.

The present paint further includes an active solvent that is compatible with the polyurethane resin. In the preferred formulation, the active solvent is mineral spirits, and, preferably, mineral spirits 66 as commercially available from Ashland Distribution Company of Dublin, Ohio. The active solvent is present in a concentration of about 5 percent to about 10 percent, by weight, of the paint, and preferably about 6 percent, by weight, of the paint. It has been found that the use of the preferred active solvent provides for an advantageously quick-drying paint. That is, the solvent evaporates readily and quickly, thus producing a fast-drying, "hard" and durable marking, and allowing the marked item to be handled soon after marking.

It is anticipated that other solvents can be used in formulation of the paint. Those skilled in the art will recognize the various solvents, combinations of solvents and proportions of selected solvents that will be compatible with the polyurethane resin, which other solvents are within the scope and spirit of the present invention.

A gelative additive is included in the marking paint of the present invention to help regulate the drying speed of the paint. The preferred gelative additive is the solvent diacetone alcohol, such as that commercially available from Ashland Distribution Company of Dublin, Ohio. In the preferred paint formulation, the diacetone alcohol gelative additive is present in a concentration of about 1 percent to about 5 percent, by weight, of the paint, and preferably about 1.5 percent, by weight, of the paint. A diacetone alcohol having a purity of about greater than 98 percent is preferred.

Unlike the active solvent, the gelative additive solvent is a slower drying, or evaporating, solution. That is, the gelative additive tends to slow the evaporation and drying of the paint. Regulating the drying time of the paint assures that the paint dries quickly, but not so quickly that the paint prematurely cures. It is anticipated that other alcohols can be used as the gelative additive, which other alcohols will be recognized by those skilled in the art and are within the scope and spirit of the present invention.

To avoid sedimentation of the pigment, and to improve the rheologic characteristics of the paint, the preferred embodiment of the paint of the present invention further includes a thixotropic rheological additive, such as the organically modified hectorite clay commercially available from Elementis Specialties in Hightstown, N.J. under the trademark Bentone 38. The rheological additive serves, in addition, as a thickener. In the preferred embodiment, the rheological additive is present in a concentration of about 1 percent to about 5 percent, by weight, of the paint, and preferably about 4.5 percent, by weight, of the paint.

The paint further includes in the preferred embodiment a fluorescent pigment present in a concentration of about 20 percent to about 30 percent, by weight, of the paint, and preferably about 24.5 percent, by weight, of the paint. The preferred pigment is a synthetic orange colorant, such as that available from Day-Glo Color Corporation of Cleveland, Ohio under the trade name A-X-15N (Blaze Orange A Pigment). Other pigments, as well as other colors of dyes, will be recognized by those skilled in the art.

Also included in the preferred embodiment of the paint of the present invention is an anti-skinning additive. Anti-skinning additives are volatile solutions designed to prevent the premature surface cure of the paint when it is applied to an item. In the preferred embodiment, the paint includes about 1 percent to 5 percent, by weight, of an anti-skinning additive. More preferably, the anti-skinning additive of the present invention comprises a combination of two commercially available additives, namely Exkin #2 (a methyl ethyl ketoxime) and Guiacol Special C (a guiacol) from Condea Servo LLC in South Plainfield, N.J. In the preferred embodiment, the paint contains about 2.9 percent, by weight, Exkin #2 and about 0.3 percent, by weight, Guiacol Special C.

The paint of the preferred embodiment further includes a wetting agent in a concentration of about less than 1 percent, by weight, of the paint to more effectively disperse the pigment in the paint. Preferably, the wetting agent is present in a concentration of about 0.1 percent, by weight. A suitable wetting agent is soya lecithin, such as that commercially available from Archer Daniel Midland Company in Decatur, Ill.

Finally, the paint in the preferred embodiment of the present invention includes a synthetic drier. The synthetic drier is present in a concentration of about less than 1 percent, by weight, and preferably about 0.3 percent, by weight, of the paint. In the preferred embodiment, the synthetic drier comprises a combination of cobalt and zirconium soaps. More preferably, the cobalt soap is present in a concentration of about 0.1 percent, by weight, in the paint and is of the type commercially available from Condea Servo LLC in South Plainfield, N.J. under the trademark Nuodex Cobalt 12% (12% cobalt solution). The zirconium soap preferably is present in a concentration of about 0.2 percent, by weight, in the paint and is of the type commercially available from Condea Servo LLC in South Plainfield, N.J. under the trademark Nuodex Zirconium 24% (24% zirconium solution).

It has been found that the use of the preferred combination of synthetic driers provides for an advantageously quick-drying paint. That is, the driers complement the active solvent and evaporate readily and relatively quickly, thus producing a fast-drying, "hard" and durable marking, and allowing the marked item to be handled soon after marking. Based on preliminary informal testing, a marking made using the paint of the present invention dried in about 6 hours, while a similar marking made using a prior art paint dried in about 24 hours.

As will be recognized by those skilled in the art, the present paint, having an organic base (e.g., in an organic solvent solution), will adhere to items that have been coated or otherwise protected with, for example, a light oil. Many such items are fabricated from carbon steel materials or materials that may be susceptible to oxidation. Thus, upon machining, such items, including nuts, bolts, screws and other fasteners, often are coated with a light oil to prevent oxygen from contacting the parts' surfaces. The present paint is formulated to penetrate such oil coating and to permit the paint to contact the item surface. The present paint will readily adhere to such items, and will not easily rub off the items.

Since some of the items marked using the paint of the present invention may be exposed to elevated temperature environments, an advantageous property of the present paint is its fluorescent durability. A preliminary informal test was conducted using the paint of the present invention and a prior art inspection paint. An item containing markings made using the paint of the present invention and a prior art inspection paint was exposed to an elevated temperatures of about 300 degrees Fahrenheit and then cooled to room temperature. Under UV light, the marking made using the paint of the present paint fluoresced, while the marking made using the prior art inspection paint did not.

Those skilled in the art will appreciate that the present marking paint can be used in myriad applications and may be dispensed from many different containers. For example, in the preferred embodiment, the present paint may be dispensed from a flexible, squeezable tube having a narrow outlet configured to produce a controlled output of paint, preferably in a thin line. Such tubes are known to those skilled in the art, as are other containers configured to store and dispense the paint.

The fluorescent paint of the present invention preferably is used as an inspection paint to detect relative movement between adjacent items. For example, as shown in FIG. 1, the paint of the present invention may be used to determine whether a sealing bolt has been loosened or removed from a chassis 1. Chassis 1 is sealed using a washer 2 and a bolt 3 tightened to an appropriate torque. A marking 4 is formed across chassis 1, washer 2 and bolt 3 using the paint of the present invention and allowed to dry. As shown in FIG. 2, if bolt 3 is loosened from chassis 1, either intentionally or by vibration loosening, marking 4 breaks into separate pieces (represented by 4a, 4b and 4c), and provides notice that bolt 2 has been loosened.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

In the present disclosure, the words "a" or "an" are to be taken to include both the singular and the plural. Conversely, any reference to plural items shall, where appropriate, include the singular.

All patents referred to herein, are hereby incorporated herein by reference, whether or not specifically done so within the text of this disclosure.

What is claimed is:

1. A resin based fluorescent paint for marking items comprising:
    a polyurethane resin present in a concentration of about 55 percent to about 65 percent, by weight, of the paint;
    a solvent for and compatible with the resin present in a concentration of about 5 percent to about 10 percent, by weight, of the paint;
    a gelative additive present in a concentration of about 1 percent to about 5 percent, by weight, of the paint;
    a rheological additive present in a concentration of about 1 percent to about 5 percent, by weight, of the paint;
    an anti-skinning additive present in a concentration of about 1 percent to about 5 percent, by weight, of the paint;
    a fluorescent pigment present in a concentration of about 20 percent to about 30 percent, by weight, of the paint;
    a synthetic drier in a concentration of about less than 1 percent, by weight, of the paint; and
    a wetting agent in a concentration of about less than 1 percent, by weight, of the paint.

2. The paint in accordance with claim 1 wherein the solvent is mineral spirits.

3. The paint in accordance with claim 1 wherein the gelative additive is diacetone alcohol.

4. The paint in accordance with claim 1 wherein the rheological additive is hectorite clay.

5. The paint in accordance with claim 1 wherein the fluorescent pigment is a synthetic colorant.

6. The paint in accordance with claim 5 wherein the synthetic colorant is orange.

7. The paint in accordance with claim 1 wherein the paint is orange.

8. The paint in accordance with claim 1 wherein the anti-skinning additive is a methyl ethyl ketoxime.

9. The paint in accordance with claim 1 wherein the anti-skinning additive is a guiacol.

10. The paint in accordance with claim 1 wherein the anti-skinning additive is a combination of methyl ethyl ketoxime and guiacol.

11. The paint in accordance with claim 10 wherein the methyl ethyl ketoxime is present in a concentration of about 2.9 percent, by weight, of the paint and the guiacol is present in a concentration of about 0.3 percent, by weight, of the paint.

12. The paint in accordance with claim 1 wherein the wetting agent is soya lecithin.

13. The paint in accordance with claim 1 wherein the synthetic drier is cobalt soap.

14. The paint in accordance with claim 1 wherein the synthetic drier is zirconium soap.

15. The paint in accordance with claim 1 wherein the synthetic drier is a combination of cobalt soap and zirconium soap.

16. The paint in accordance with claim 15 wherein the cobalt soap is present in a concentration of about 0.1 percent, by weight, of the paint and the zirconium soap is present in a concentration of about 0.2 percent, by weight, of the paint.

* * * * *